United States Patent

[11] 3,596,059

| [72] | Inventor | Nathaniel E. Hager, Jr.<br>Lancaster, Pa. |
|---|---|---|
| [21] | Appl. No | 861,622 |
| [22] | Filed | Sept. 29, 1969 |
| [45] | Patented | July 27, 1971 |
| [73] | Assignee | Armstrong Cork Company<br>Lancaster, Pa. |

[54] FOOD CONTAINER HEATING SYSTEM
3 Claims, 1 Drawing Fig.

[52] U.S. Cl..................................................... 219/432,
219/435, 219/521, 219/543, 219/552
[51] Int. Cl............................................................ F27d 11/02
[50] Field of Search............................................ 219/543,
528, 497, 385, 424, 436; 338/212, 199, 308;
29/535

[56] References Cited
UNITED STATES PATENTS

| 1,978,089 | 10/1934 | Jones | 219/432 |
|---|---|---|---|
| 2,680,190 | 6/1954 | Schmidt | 219/432 |
| 2,863,037 | 12/1958 | Johnstone | 219/432 |
| 3,025,383 | 3/1962 | Forsness | 219/432 X |
| 3,026,400 | 3/1962 | Van Sciver | 219/543 X |
| 3,092,704 | 6/1963 | De Woody et al. | 219/385 |
| 3,125,739 | 3/1964 | Deibel et al. | 219/549 UX |
| 3,221,145 | 11/1965 | Hager, Jr. | 219/543 X |
| 3,448,246 | 6/1969 | Armbruster | 219/528 |
| 3,505,498 | 4/1970 | Shevlin | 219/385 |

*Primary Examiner*—Volodymyr Y. Mayewsky
*Attorney*—Clifford B. Price

ABSTRACT: The container-heating system comprises a three part structure consisting of a food container, a heater integral therewith, and a power supply receptacle for the heater. The power supply receptacle may use either a car electrical system or a transformer structure which converts 110 v. to 12 v. The heater is a special high-output heater which is fastened to the base of the food container. The food container with its heater is placed upon the power supply and the heater rapidly heats the food within the container.

PATENTED JUL 27 1971  3,596,059
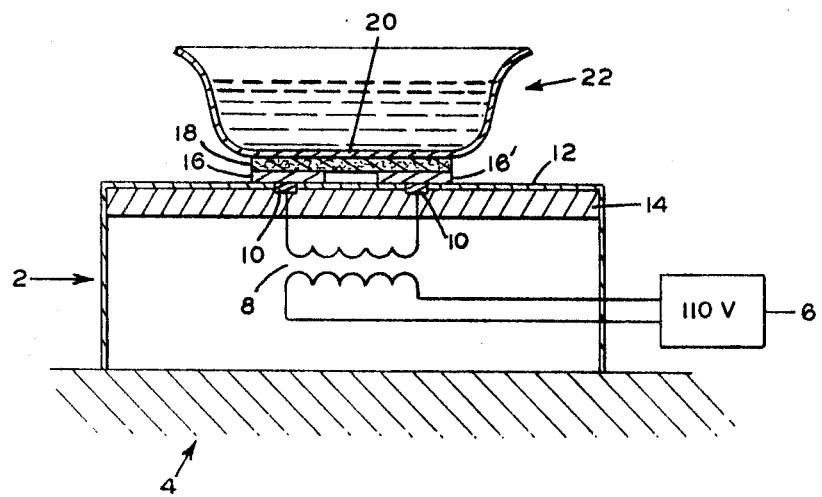
INVENTOR
NATHANIEL E. HAGER, JR.
BY Clifford B. Price
ATTORNEY

FOOD CONTAINER HEATING SYSTEM

CROSS-REFERENCE TO RELATED APPLICATION

The invention herein utilizes the heater and container-heater combination set forth in copending application Ser. No. 861,694 filed Sept. 29, 1969, titled "Split-Electrode Series-Laminated Heater."

BACKGROUND OF THE INVENTION

1. Field of the Invention

The invention relates to the heating of substances contained in packages of relatively small size and, more particularly, is directed to a system for rapidly heating the substances contained in the packages.

2. Description of the Prior Art

Combination package heaters are known in the art as shown in U.S. Pat. No. 3,296,415. The structures therein are a wraparound type of heater which envelopes and closely contacts the container body for the purpose of slowly heating the material within the container. The heating element must be clamped within the power supply and a structure is provided to tightly draw the heating element against the outside of the container.

The object of the invention herein is to provide a rapid heater which is selectively positioned relative to a small area of the food container for the purpose of rapidly heating the food within the container by taking advantage of convection action by the food within the container. Such a feat is accomplished by the use of a very small heater which provides economies in cost and the heater is so designed that it may be rapidly assembled to a power supply receptacle providing an ease of operation for the ordinary housewife or worker.

SUMMARY OF THE INVENTION

A power supply receptacle is provided to produce low voltage current to operate the heater. The power supply receptacle has a flat, thermally insulated surface upon which the combination food container and heater may be placed. This particular surface has available contact points which provide the power to the heater of the food container. The food container heater is positioned on the food container so that it will be positioned between the power supply receptacle and the food container. The heater is preferable upon the bottom of the container so that the container may merely be sat upon the power supply receptacle. The design of the heater is such that proper orientation of the container to the heater readily connects the electrodes of the heating elements to the contact points on the flat surface of the power supply receptacle. The high output heater provides a high concentration of heat at the bottom of the food container just as with the normal cooking pot on an electric range. Through the use of manual stirring along with convection, the bubbling of the food within the food container provides a rapid warming of the food.

BRIEF DESCRIPTION OF THE DRAWING

The drawing is a side view and section of the container heating system.

DESCRIPTION OF THE PREFERRED EMBODIMENT

The power supply receptacle 2 is placed upon a base 4 and connected to a power supply 6. If the power supply receptacle is to be used in an automobile, it will be connected to the battery of the car and its output will be 12 v. If the power supply receptacle is to be used within the home or office, it would be plugged into a 110 volt source and a transformer 8 would be incorporated within the power supply receptacle for the purpose of reducing the output of the power source to approximately 12 v. The output of the power supply receptacle is present at the two coplanar electrical contacts 10 which are present on the surface 12 of the power supply receptacle.

The surface 12 of the power supply receptacle is preferably flat in the region under the heater so that a container of food may merely be rested upon the surface. This surface is provided with some type of thermal insulation 14 or the surface 12 itself could actually be made of a thermal insulating material. The existence of the thermal insulation prevents the dissipation of heat in a downward direction away from the heating element which is connected to the container of food. This means that all available radiating heat generated by the heating element is directed upwardly into the food and none is dissipated to the surrounding atmosphere as lost or wasted heat.

The heating element is a split-electrode series-connected laminated heater which is of the type disclosed in the above mentioned copending application. As shown in the drawing, the particular embodiment therein utilizes the two split electrodes 16 and 16' bonded to a conductive layer 18 and this, in turn, is bonded to the bottom 20 of the food container 22. The principal current flow will be from split electrode 16' through the conductive layer 18 to the bottom of the container 20 and then from the bottom of the container 20 back through the conductive layer 18 to the split electrode 16. The resistivity of the conductive layer functions as the heater for generating the heat used to warm the food.

It should be noted that the basic theory here is the placing of the heating element in conjunction with the food container and power supply receptacle so that the heating element is in a horizontal plane with the food disposed on one side of the horizontal plane and a thermally insulated power supply receptacle on the other side of the horizontal plane. Using the heater of this application, an 8 ounce container of stew was heated for 5 minutes. The upper surface of the stew was heated at that time to 160° F., while the middle of the mass of stew had been heated to 195° F. and the bottom surface of the container had experienced heat in excess of 250° F. Therefore, it would be seen that the bottom portion of the container and food in that area are heated in excess of 212°, the boiling point for water, while the food in the upper portion of the container is heated to substantially less than 212°. In the above example, the heater covered 5.5 sq. inches of a container having 36 sq. inches surface area. Truly, the heater must be considered a concentrated type heater. This type of heating provides several advantages over the prior art. In the first place, a concentrated heater structure is utilized which is substantially cheaper in cost than the wraparound type of heater such as that used in U.S. Pat. No. 3,296,415. The concentrated type heater does not provide for uniform temperature throughout the body of the food, but it does provide a uniform heat in a concentrated area. In other words, the heater generates heat everywhere within its perimeter at a rate per unit area substantially equal to the average within that perimeter. The heater of U.S. Pat. No. 3,296,415 requires a very slow heating. The heater of this invention provides for fast heating due to the uniform concentrated heating and the convection action within the food.

The placing of the heater on the bottom of the container or that portion of the container which will place the food above the heater provides several advantages. The high-concentrated heat generated and distributed in a uniform pattern at the bottom of the container causes the liquid to move by convection and to turn to steam and as the steam rises, it causes a bubbling and agitation within the fluid to secure faster heating. This differs from conventional cooking in that that type of cooking has heat generated in a nonuniform pattern and requires a heavy conductive pan bottom to distribute the heat uniformly. Herein the container wall is thin and lightweight resulting in a lessening of heat waste by lateral flow within the container walls. This thin wall will not function as does the pan bottom and, therefore, the heater must provide uniform distribution. The agitation or convection within the food can be assisted by a stirring action which further speeds up the heating. The placing of the heater with the food on one side and a thermal insulation on the other side means that the thermal insulation cuts down heat loss in the direction away from the food and, therefore, all but 5—10 percent of the used heat output of the heater is utilized to warm the food. Finally, the above technique for heating food provides for a quick and easy structure for connecting the heater up to the power supply receptacle. In effect, all one need do is place the container upon the power supply receptacle and provide some type of simple directions or keying provision between the container and heater to insure that the electrical contacts of the power source engage the separate split electrodes, i.e., so both contacts do not touch the same electrode, thus short circuiting the power supply.

Finally, it should be noted that the substance contained within the container need not be particularly food, but could be waxes, glue or other materials that require warming and are liquid in their heated state.

I claim:

1. A disposable container and heater heating system for food and the like wherein there is provided an electrical power supply receptacle adapted to provide electrical power for a heater, a thin-walled, one-time use metal container, the wall thickness of the container being so constructed that it lacks the ability to accumulate and uniformly distribute heat to the contents thereof, said heater comprising a layer of electrical resistance material integral with and centrally disposed only on the outside bottom surface of said container, said electrical resistance material having electrical contact elements thereon adapted to be connected to a source of electrical current whereby, when the combined heater and container are placed upon the power supply receptacle, the heater is disposed only below the contents of the container and said power supply receptacle is provided with a thermally insulated surface containing electrical contacts which connect the source of electrical current with the heater and the thermal insulation causes the heater to direct most of its heat toward the food in the container to be heated.

2. The system of claim 1 wherein the heater covers less than one-half of the outside area of the container.

3. The system of claim 2 wherein the heater generates heat everywhere within its perimeter at a rate per unit area substantially equal to the average within said perimeter.